(12) United States Patent
Park et al.

(10) Patent No.: US 9,288,829 B2
(45) Date of Patent: Mar. 15, 2016

(54) METHOD FOR PERFORMING DEVICE TO DEVICE DIRECT COMMUNICATION, METHOD FOR SUPPORTING THE SAME, AND DEVICE THEREFOR

(75) Inventors: Kyujin Park, Anyang-si (KR); Jiwoong Jang, Anyang-si (KR); Hangyu Cho, Anyang-si (KR); Seunghyun Kang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 101 days.

(21) Appl. No.: 14/239,443

(22) PCT Filed: Aug. 14, 2012

(86) PCT No.: PCT/KR2012/006475
§ 371 (c)(1),
(2), (4) Date: Apr. 7, 2014

(87) PCT Pub. No.: WO2013/025040
PCT Pub. Date: Feb. 21, 2013

(65) Prior Publication Data
US 2015/0071189 A1 Mar. 12, 2015

Related U.S. Application Data

(60) Provisional application No. 61/524,772, filed on Aug. 18, 2011, provisional application No. 61/531,003, filed on Sep. 4, 2011.

(51) Int. Cl.
*H04W 76/02* (2009.01)
*H04W 56/00* (2009.01)
(Continued)

(52) U.S. Cl.
CPC ............ *H04W 76/023* (2013.01); *H04W 8/005* (2013.01); *H04W 56/00* (2013.01);
(Continued)

(58) Field of Classification Search
CPC ... H04W 76/023; H04W 56/00; H04W 72/04; H04W 76/021; H04W 8/005; H04W 72/12; H04W 8/26

USPC .......................................... 370/310, 328, 329
See application file for complete search history.

(56) References Cited

U.S. PATENT DOCUMENTS 8,811,961 B2 * 8/2014 Lee et al. ...................... 455/415
2010/0260093 A1 * 10/2010 Liu et al. ....................... 370/315
(Continued)

FOREIGN PATENT DOCUMENTS

WO 2008042889 4/2008
WO 2010049801 5/2010
(Continued)

OTHER PUBLICATIONS

PCT International Application No. PCT/KR2012/006475, Written Opinion of the International Searching Authority dated Feb. 26, 2013, 17 pages.

*Primary Examiner* — Chi H Pham
*Assistant Examiner* — Robert Lopata
(74) *Attorney, Agent, or Firm* — Lee, Hong, Degerman, Kang & Waimey (57) ABSTRACT

Disclosed are a method for performing and supporting device to device direct communication (D2D communication) in a wireless communication system and a device therefor. The method for performing D2D communication of a terminal comprises the steps of: transmitting a first message, which is a request from a terminal operated in an idle state for connecting D2D communication and the base station, to a base station; and receiving a second message as a response to the request from the base station, wherein the second message includes a C-RNTI (Cell-Radio Network Temporary Identifier) allocated in the terminal to be connected with the base station, a D2D-RNTI (Device to Device RNTI) allocated in the terminal for D2D communication, and/or peer discovery configuration information.

10 Claims, 9 Drawing Sheets

(51) Int. Cl.
  *H04W 8/00*   (2009.01)
  *H04W 72/04*  (2009.01)
  *H04W 72/12*  (2009.01)
  *H04W 8/26*   (2009.01)
  *H04W 92/18*  (2009.01)

(52) U.S. Cl.
  CPC ........... *H04W 72/04* (2013.01); *H04W 76/021* (2013.01); *H04W 8/26* (2013.01); *H04W 72/12* (2013.01); *H04W 92/18* (2013.01)

(56) References Cited

U.S. PATENT DOCUMENTS

2012/0015607 A1* 1/2012 Koskela et al. ................. 455/62
2012/0028672 A1* 2/2012 Chen et al. .................... 455/522
2012/0040700 A1* 2/2012 Gomes et al. ................. 455/500
2012/0083283 A1* 4/2012 Phan et al. .................... 455/450
2012/0106517 A1* 5/2012 Charbit et al. ................ 370/336
2012/0129540 A1* 5/2012 Hakola et al. ................. 455/450
2012/0163311 A1* 6/2012 Park ............................. 370/329
2013/0012221 A1* 1/2013 Zou et al. ................... 455/452.1
2013/0015953 A1* 1/2013 Hsu et al. ..................... 340/7.46
2013/0201954 A1* 8/2013 Gao et al. ..................... 370/329

FOREIGN PATENT DOCUMENTS

WO    2010054578    5/2010
WO    2010090381    8/2010

* cited by examiner

Option 1

Option 2

FIG. 9

METHOD FOR PERFORMING DEVICE TO DEVICE DIRECT COMMUNICATION, METHOD FOR SUPPORTING THE SAME, AND DEVICE THEREFOR

CROSS-REFERENCE TO RELATED APPLICATIONS

This application is the National Stage filing under 35 U.S.C. 371 of International Application No. PCT/KR2012/006475, filed on Aug. 14, 2012, which claims the benefit of U.S. Provisional Application Ser. Nos. 61/524,772, filed on Aug. 18, 2011, and 61/531,003, filed on Sep. 4, 2011, the contents of which are all hereby incorporated by reference herein in their entirety.

TECHNICAL FIELD

The present invention relates to wireless communication and, more particularly, to a method for performing device-to-device (D2D) direct communication, a method for supporting the same and a device therefor.

BACKGROUND ART

With recent propagation of smartphones and tablet PCs and activation of large-capacity multimedia communication, mobile traffic abruptly increases. Mobile traffic increase is expected to double every year. Since most mobile traffic is transmitted through base stations, common carriers are facing serious network load problems. Accordingly, common carriers increases network installation in order to process increasing traffic and commercialize next-generation mobile telecommunication standards for efficiently processing a large amount of traffic, such as mobile WiMAX, LTE (Long Term Evolution), etc. However, other solutions are needed to handle rapidly increasing traffic.

Device-to-device (D2D) communication is a distributed communication technology for directly transmitting traffic between neighboring nodes without using infrastructure such as base stations. In a D2D communication environment, each node such as a terminal finds another terminal physically adjacent thereto, establishes a communication session and then transmits traffic to the other terminal Since D2D communication can solve a traffic overload problem by distributing traffic converging on a base station, it is in the spotlight as a technical element of a next-generation mobile telecommunication following 4G. For this reason, standardization organizations such as 3GPP, IEEE, etc. are promoting D2D communication standards established on the basis of LTE-A or Wi-Fi and telecommunication companies such as Qualcomm, etc. are developing independent D2D communication technologies.

D2D communication is expected to improve mobile communication system performance and to create new communication services. Furthermore, D2D communication can support proximity based social networking service, network games, etc. Connectivity problems in shadow area terminals may be solved using a D2D link as a relay. In this manner, D2D technology is expected to provide new services in various applications.

In reality, machine-to-machine communication schemes such as infrared communication, ZigBee, RFID (radio frequency identification) and NFC (near field communications) based thereon have been widely used. However, these technologies support only communication for special purposes within a very limited distance (1 m or less), and thus it is difficult to categorize the same as a D2D communication scheme.

While the concept of D2D communication has been discussed, D2D communication is not currently used.

DISCLOSURE

Technical Problem

An object of the present invention devised to solve the problem lies in a method for performing direct D2D communication in a wireless communication system.

Another object of the present invention is to provide a method for supporting direct D2D communication performed by a base station in a wireless communication system.

Still another object of the present invention is to provide user equipment (UE) for performing direct D2D communication.

Yet another object of the present invention is to provide a base station supporting direct D2D communication.

The technical problems solved by the present invention are not limited to the above technical problems and those skilled in the art may understand other technical problems from the following description.

Technical Solution

The object of the present invention can be achieved by providing a method for performing D2D (device-to-device) direct communication by a user equipment (UE), including: transmitting, to the base station, a first message including a D2D connection request for D2D direct communication, the UE is connected with a base station; and receiving, from the base station, a second message corresponding to a response to the D2D connection request, wherein the second message includes at least one of a D2D-RNTI (radio network temporary identifier) allocated to the UE for D2D direct communication and peer discovery configuration information. The method may further include transmitting a peer discovery signal to at least one neighboring UE on the basis of the peer discovery configuration information. The peer discovery configuration information may include at least one of peer discovery logical channel ID, seed sequence information, cyclic shift information and peer discovery signal transmission period information. The method may further include transmitting a scheduling request or bandwidth request signal to the base station and receiving uplink resource allocation information from the base station as a response to the scheduling request or bandwidth request signal, wherein the first message is transmitted on the basis of the uplink resource allocation information.

In another aspect of the present invention, provided herein is a method for performing D2D direct communication by a user equipment (UE), including: transmitting, to a base station, a first message including a D2D connection request and a cellular connection request, and the UE operates in an idle state; and receiving, from the base station, a second message corresponding to a response to the D2D connection request and cellular connection request, wherein the second message includes at least one of a C-RNTI (cell-radio network temporary identifier) allocated to the UE for connection with the base station, a D2D-RNTI allocated to the UE for D2D direct communication and peer discovery configuration information. The method may further include transmitting a peer discovery signal to at least one neighboring UE on the basis of the peer discovery configuration information. The peer discovery configuration information may include at least one of peer discovery logical channel ID, seed sequence information, cyclic shift information and peer discovery signal transmission period information.

In another aspect of the present invention, provided herein is a method for supporting D2D direct communication by a base station in a wireless communication system, the method including: receiving a first message including a D2D connection request and a cellular connection request from a user equipment (UE), the UE operates in an idle state; and transmitting, to the UE, a second message corresponding to a response to the D2D connection request and cellular connection request, wherein the second message includes at least one of a C-RNTI allocated to the UE for connection with the base station, a D2D-RNTI allocated to the UE for D2D direct communication and peer discovery configuration information. The peer discovery configuration information may include at least one of peer discovery logical channel ID, seed sequence information, cyclic shift information and peer discovery signal transmission period information.

In another aspect of the present invention, provided herein is a user equipment (UE) for performing D2D direct communication including: a transmitter for transmitting, to a base station, a first message including a D2D connection request for D2D direct communication from the UE, the UE is connected to the base station; and a receiver for receiving, from the base station, a second message corresponding to a response to the D2D connection request, wherein the second message includes at least one of a D2D-RNTI allocated to the UE for D2D direct communication and peer discovery configuration information. The UE may further include a processor for controlling the UE to transmit a peer discovery signal to at least one neighboring UE on the basis of the peer discovery configuration information, wherein the transmitter transmits the peer discovery signal to the at least one neighboring UE under the control of the processor.

In another aspect of the present invention, provided herein is a user equipment (UE) for performing D2D direct communication in a wireless communication system including: a transmitter for transmitting, to a base station, a first message including a D2D connection request and a cellular connection request from the UE, the UE operates in an idle state; and a receiver for receiving, from the base station, a second message corresponding to a response to the D2D connection request and cellular connection request, wherein the second message includes at least one of a C-RNTI allocated to the UE for connection with the base station, a D2D-RNTI allocated to the UE for D2D direct communication and peer discovery configuration information. The UE may further include a processor for controlling the UE to transmit a peer discovery signal to at least one neighboring UE on the basis of the peer discovery configuration information, wherein the transmitter transmits the peer discovery signal to the at least one neighboring UE under the control of the processor.

In another aspect of the present invention, provided herein is a base station for supporting D2D direct communication including: a receiver for receiving a first message including a D2D connection request and a cellular connection request from a user equipment (UE), the UE operates in an idle state; and a transmitter for transmitting, to the UE, a second message corresponding to a response to the D2D connection request and cellular connection request, wherein the second message includes at least one of a C-RNTI allocated to the UE for connection with the base station, a D2D-RNTI allocated to the UE for D2D direct communication and peer discovery configuration information.

Advantageous Effects

According to embodiments of the present invention, a UE can efficiently perform a network entry procedure for D2D communication.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that 3GPP LTE and LTE-A mobile communication systems are used. However, the description is applicable to any other mobile communication system except for specific features inherent to the 3GPP LTE and LTE-A systems.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a user equipment (UE) is assumed to refer to a mobile or fixed user end device such as a mobile station (MS), an advanced mobile station (AMS), etc. The term 'base station (BS)' is assumed to refer to any node of a network end, such as a Node B, eNode B, an access point (AP), etc., communicating with a UE. In the specification, the BS may include a cell, a sector, etc.

In a mobile communication system, a UE may receive information from a BS on a downlink and transmit information to the BS on an uplink. The information that the UE transmits or receives includes data and various types of control information. There are many physical channels according to the types and usages of information that the UE transmits or receives.

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE.

It should be noted that specific terms disclosed in the present invention are proposed for convenience of description and better understanding of the present invention, and the use of these specific terms may be changed to other formats within the technical scope or spirit of the present invention.

3GPP LTE/LTE-A will be described as an exemplary mobile communication system to which the present invention is applicable.

Figure 1:
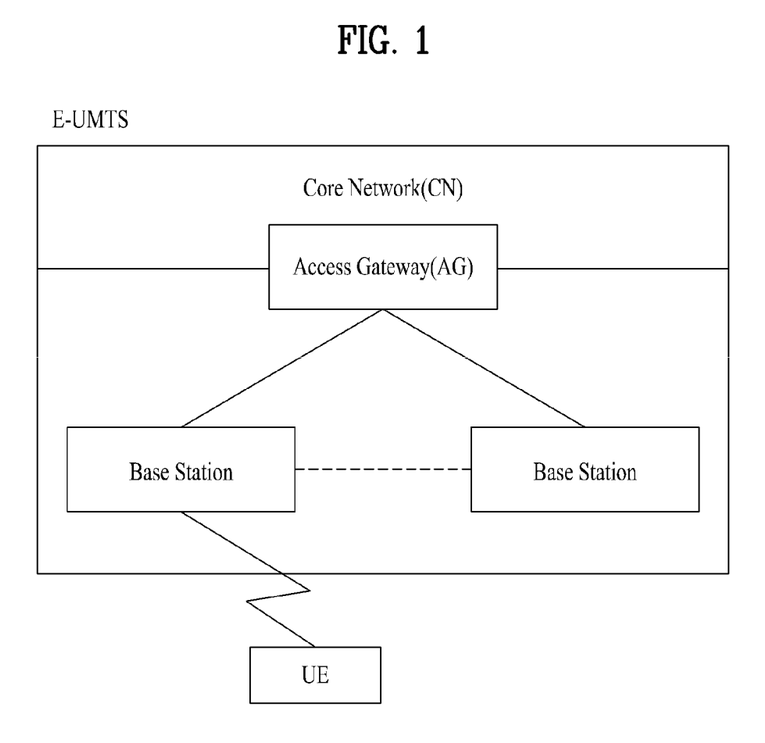
FIG. 1 illustrates E-UMTS network architecture as an exemplary mobile communication system.

FIG. 1 illustrates E-UMTS network architecture as an exemplary mobile communication system.

E-UMTS, which evolves from UMTS, is under standardization according to 3GPP. E-UMTS may be regarded as an LTE system. Technical specification of UMTS and E-UMTS refers to Release 8 and Release 9 of "$3^{rd}$ Generation Partnership Project: Technical Specification Group Radio Access Network".

Referring to FIG. 1, E-UMTS includes a user equipment (UE), an eNB and an access gateway (AG) located at the end of a network (E-UTRAN) and connected to an external network. The eNB can simultaneously transmit multiple data streams for broadcast service, multicast service and/or unicast service.

One or more cells are present in one eNB. A cell is set to one of bandwidths of 1.25, 2.5, 5, 10, 15 and 20 MHz and provides downlink or uplink transmission service to multiple UEs. Different cells may be configured to provide different bandwidths. The eNB controls data transmission/reception with respect to a plurality of UEs. The eNB transmits downlink scheduling information about downlink data to a corresponding UE to inform the UE of a time/frequency region used to transmit the data, coding information, data size, hybrid automatic repeat and request (HARQ) related information, etc. In addition, the eNB transmits uplink scheduling information about uplink data to a corresponding UE to notify the UE of a time/frequency region that can be used by the UE, coding information, data size, HARQ related information, etc. An interface for user traffic or control traffic transmission may be used between eNBs. A core network (CN) may be composed of the AG and a network node for user registration of the UE. The AG manages UE mobility per TA (tracking area) including a plurality of cells.

While wireless communication technology has been developed to LTE on the basis of wideband code division multiple access (WCDMA), demands and expectations of users and carriers steadily increase. Furthermore, technical evolution in wireless communication technology is required to have competitiveness since other wireless access techniques are being developed. That is, decrease in cost per bit, service availability increase, use of flexible frequency band, simple architecture and open interface, adequate power consumption of UEs, etc. are needed.

Recently, 3GPP has standardized technology subsequent to LTE. This is referred to as "LTE-A" in the specification. A main difference between LTE and LTE-A is a system bandwidth different and introduction of a relay.

LTE-A aims to support a wideband of up to 100 MHz. To achieve this, LTE-A employs carrier aggregation or bandwidth aggregation that accomplishes a wideband using a plurality of frequency blocks.

Carrier aggregation uses a plurality of frequency blocks as a large logical frequency band in order to achieve a wider frequency band. The bandwidth of each frequency block can be defined on the basis of a system block bandwidth used in LTE. Each frequency block is transmitted using a component carrier.

Figure 2:
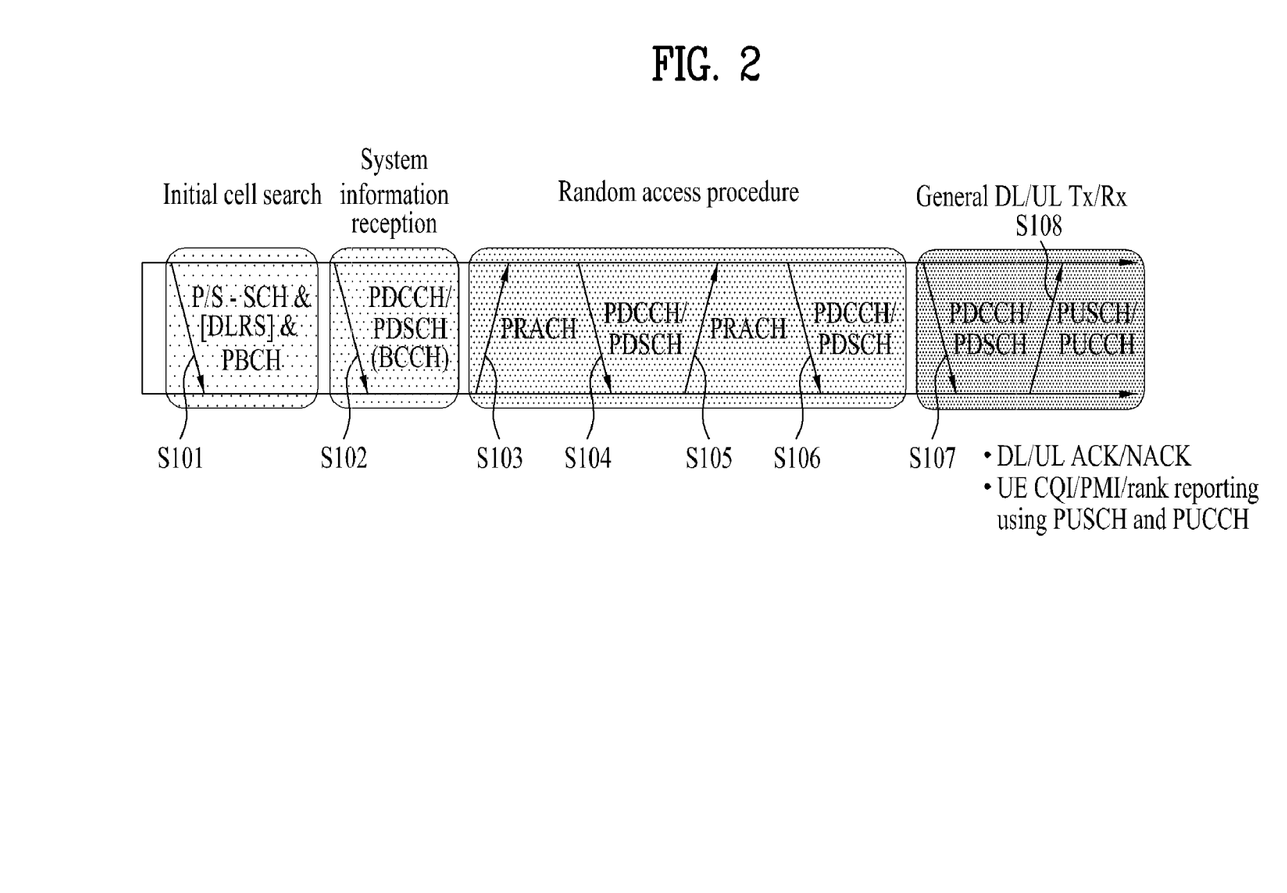
FIG. 2 illustrates physical channels for use in 3GPP LTE ($3^{rd}$ Generation Partnership Project Long Term Evolution) and a signal transmission method using the same.

FIG. 2 illustrates physical channels for use in 3GPP LTE and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

When the UE initially accesses the BS or has no radio resource for signal transmission, the UE may perform a random access procedure to access the BS in steps S103 to S106. For random access, the UE may transmit a preamble to the BS on a physical random access channel (PRACH) (S103) and receive a response message to the preamble on a PDCCH and a PDSCH corresponding to the PDCCH (S104). In the case of contention-based random access except for handover, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS through uplink or transmitted from the BS to the UE includes a DL/UL ACK/NACK signal, a channel quality indicator (CQI)/a precoding matrix index (PMI)/a rank indicator (RI), etc. In 3GPP LTE, the UE can transmit the control information such as CQI/PMI/RI through a PUSCH and/or a PUCCH.

The present invention provides a radio resource allocation scheme and a UE operation scheme for direct D2D communication in a cellular based mobile communication system. Particularly, the invention provides a scheduling method for direct D2D communication to minimize signal interference between direct D2D communication and cellular communication between a base station and a UE when cellular communication and direct D2D communication are performed in the same frequency band.

The present invention proposes a UE operation scheme according to state of a UE performing direct D2D communication and a base station operation scheme for supporting the same, which are commonly applicable to a case in which direct D2D communication is supported in a frequency band set by a base station of a cellular mobile communication system for cellular communication and a case in which a frequency band for direct D2D communication is allocated separately from the frequency band for cellular communication.

While a method for supporting a UE performing direct D2D communication in a 3GPP LTE/LTE-A system will be described for convenience, the concept of the present invention can be applied to support the UE performing direct D2D communication in other cellular mobile communication systems (e.g. IEEE 802.16e/m).

A signaling scheme for supporting communication between a cellular UE (or UE) and a base station and a UE operation scheme related thereto have been defined. Particularly, an idle mode operation in which a cellular UE that does not transmit/receive data to/from a base station for a predetermined time periodically wakes up to check only a paging signal from the base station with power off in order to reduce power consumed by antennas and a radio frequency (RF) chain was defined as a method for minimizing power consumption of the UE.

Specifically, a UE operates in two states in a conventional cellular mobile communication system. One of the states is a connected state or RRC_connected state in which the UE acquires uplink synchronization for transmitting/receiving data and control information to/from a base station through a network entry procedure with the base station and is allocated a C-RNTI (cell-radio network temporary identifier) from the base station. The other state corresponds to an idle mode or RRC_idle in which the UE is not connected with the base station, operates in a power saving mode without receiving any signal from the base station and periodically wakes up to receive only a paging signal from the base station.

As described above, a conventional UE operation scheme is designed only in consideration of communication between a UE and a base station. However, as direct D2D communication (or D2D communication) through which UEs directly exchange signals without passing through a base station increasingly draws attention, a scheme for supporting D2D communication is sought. Particularly, there is a growing need for direct D2D communication in order to create various services in LTE/LTE-A based cellular UEs and reduce base station load.

To support D2D direct communication in a cellular mobile communication system, the present invention, first of all, provides a method by which a base station defines a D2D direct communication network other than cellular networks and a UE performing D2D direct communication is separately managed by the D2D direct communication network and defines operation states of the UE performing D2D direct communication.

The present invention defines an operation framework for D2D direct communication as three steps: a peer discovery step in which a UE discovers neighboring UEs that can perform D2D communication; a paging step in which the UE finds a desired UE and requests direct communication with the desired UE; and a data transmission step for establishing a direct communication link between the two UEs and transmitting/receiving data. A UE performing D2D direct communication receives control information necessary to perform the three steps from a base station and carries out D2D direct communication according to the control information.

Definition of D2D Active State and D2D Inactive State

D2D active state refers to a UE operation state in which a UE performing D2D direct communication or capable of carrying out the same (referred to as D2D device hereinafter) receives control information necessary for D2D communication from a base station and performs D2D direct communication according to the above-described D2D direct communication framework including the three steps on the basis of the control information. That is, a UE needs to be in the D2D active state in order to perform direct communication and the UE in the D2D active state can execute the peer discovery step based on peer discovery configuration information from the base station and can be allocated a D2D-RNTI to transmit/receive control information necessary to perform direct communication between the base station and UE.

D2D inactive state refers to a state in which a UE does not perform operation for D2D direct communication. A UE in D2D inactive state does not receive control information for D2D direct communication while being allocated no D2D-RNTI for identifying a D2D device from the base station and does not carry out transmission and reception of a peer discovery signal for D2D direct communication.

D2D Network Entry Procedure

To switch a UE from D2D inactive state to D2D active state, the UE needs to perform a D2D network entry procedure with a base station. The D2D network entry procedure is carried out at the request of the UE. Here, a D2D connection request signal in a higher layer RRC signaling format, which requests D2D network entry, is defined. Upon reception of the D2D connection request signal from the UE, the base station can transmit, to the UE, a D2D-RNTI, peer discovery signal configuration information (e.g. peer discovery logical channel ID, seed sequence information, cyclic shift information, peer discovery signal transmission period information, etc.) through a D2D connection response message to the D2D connection request signal.

The D2D network entry procedure may depend on whether the UE is in the RRC_connected state or RRC_idle state. When the UE is in the RRC_connected state, the D2D network entry procedure of the UE may be performed as illustrated in FIG. 3.

Figure 3:
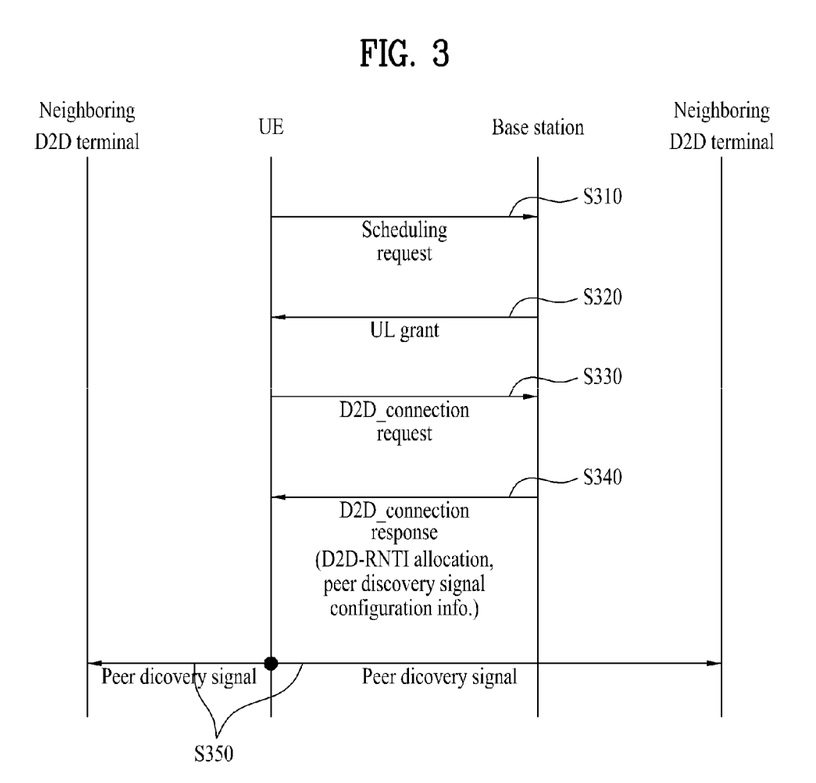
FIG. 3 illustrates a procedure through which a UE in RRC_connected state performs D2D network entry.

FIG. 3 illustrates a procedure through which a UE in the RRC_connected state performs D2D network entry.

Referring to FIG. 3, the UE may transmit a scheduling request signal (or bandwidth request signal) to the base station through a scheduling request channel (or bandwidth request channel) for data channel (e.g. physical uplink shared channel (PUSCH)) transmission (S310). Upon reception of the scheduling request signal from the UE, the base station may transmit a UL grant for the UE through a control channel (e.g. physical downlink control channel (PDCCH)) (S320). Here, the UL grant includes control information about uplink transmission of the UE. Upon reception of the UL grant from the base station, the UE may transmit a D2D connection request signal to the base station through a PUSCH resource allocated thereto (S330). Upon reception of the D2D connection request signal, the base station may transmit a D2D connection response message as a response to the UE (S340). The UE may periodically broadcast a peer discovery signal to neighboring UEs on the basis of peer discovery signal configuration information included in the D2D connection response message upon reception of the D2D connection response message from the base station (S350). Finally, the UE operates in the D2D active state through the D2D network entry procedure.

Figure 4:
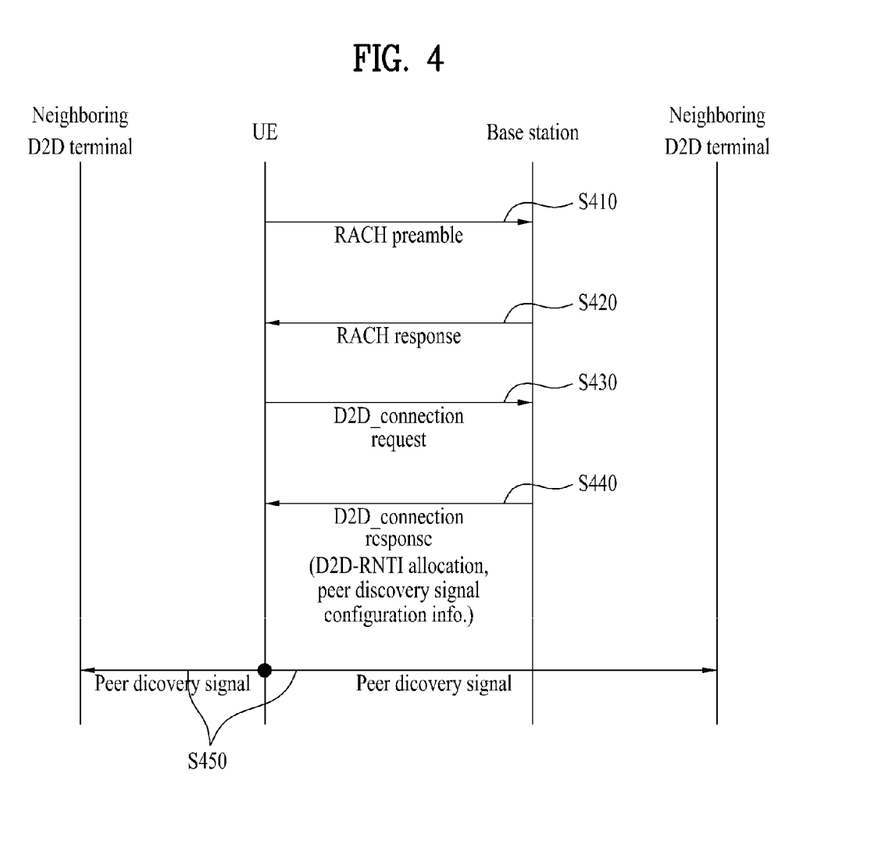
FIG. 4 illustrates a D2D network entry procedure of a UE when the UE need not enter a cellular network for D2D network entry.
Figure 5:
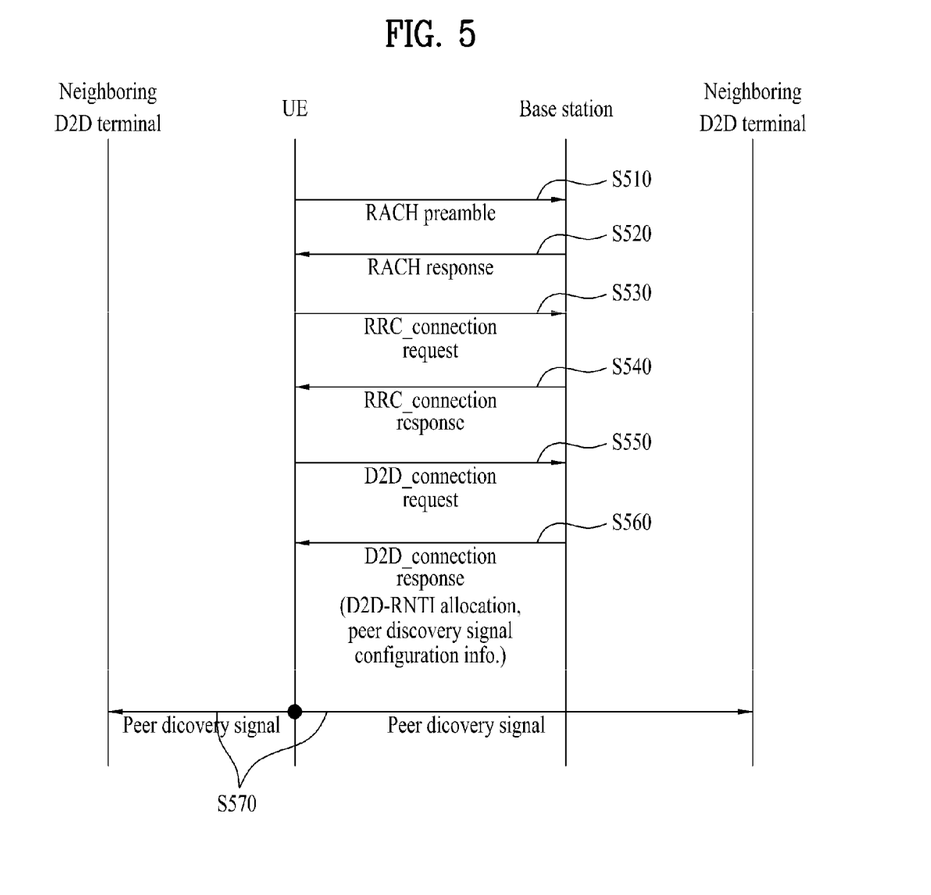
FIG. 5 illustrates a D2D network entry procedure of a UE when the UE needs to enter a cellular network for D2D network entry.
Figure 6:
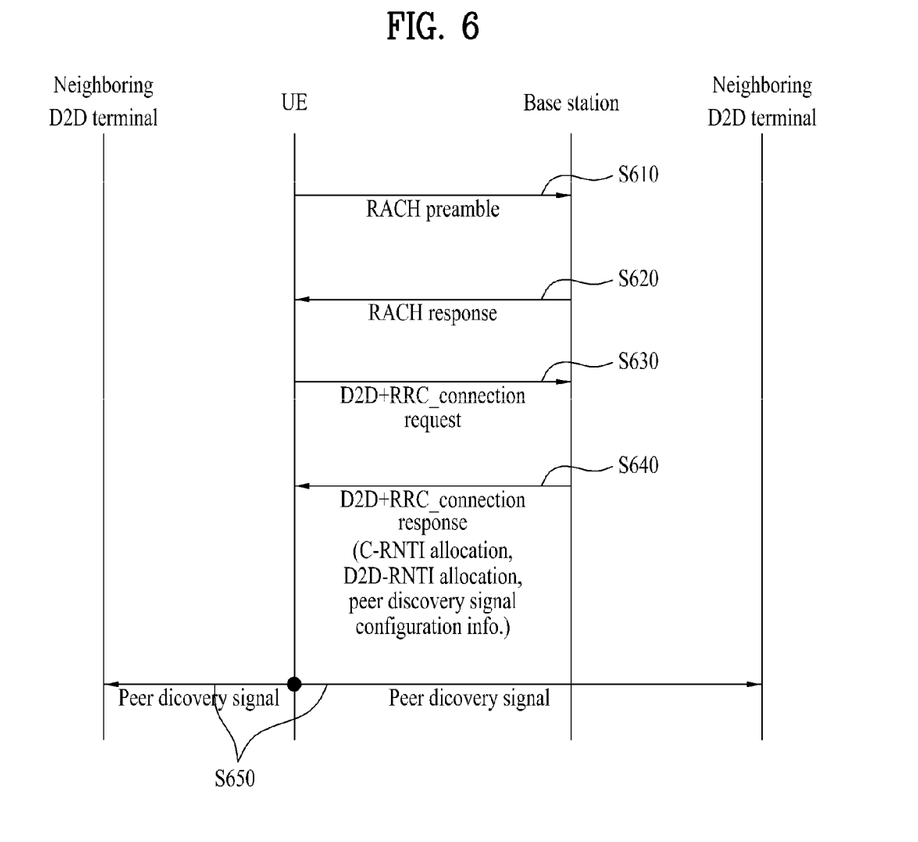
FIG. 6 illustrates a D2D network entry procedure of a UE when the UE needs to enter a cellular network for D2D network entry.

When the UE is in the RRC_idle state, a D2D network entry procedure illustrated in at least one of FIGS. 4, 5 and 6 may be performed.

FIG. 4 illustrates a D2D network entry procedure of a UE when the UE need not enter a cellular network for D2D network entry.

Referring to FIG. 4, the UE in the RRC_idle state may transmit a random access channel (RACH) preamble to the base station (S410). The base station may transmit a RACH response message to the UE as a response upon reception of the RACH preamble (S420). Then, when the UE in the RRC_idle state transmits a D2D connection request signal to the base station (S430), the base station may transmit, to the UE, a D2D connection response signal including D2D-RNTI allocation information and peer discovery signal configuration information (S440). The UE may transmit a peer discovery signal to neighboring UEs based on the D2D connection response signal (S450). When the UE need not switch to the RRC_connected state, the UE performs the D2D network entry procedure shown in FIG. 4. A case in which cellular network entry needs to be performed prior to D2D network entry is illustrated in FIGS. 5 and 6.

FIG. 5 illustrates a D2D network entry procedure of a UE when the UE needs to enter a cellular network for D2D network entry.

Referring to FIG. 5, the UE in the RRC_idle state may transmit a RACH preamble to the base station (S510). The base station may transmit a RACH response message to the UE as a response upon reception of the RACH preamble (S520). Then, the UE in the RRC_idle state transmits an RRC connection request signal to the base station for cellular network entry (S530) and the base station transmits an RRC connection response signal to the UE as a response to the RRC connection request signal (S540). Then, when the UE in RRC_idle state transmits a D2D connection request signal to the base station (S550), the base station may transmit, to the UE, a D2D connection response signal including D2D-RNTI allocation information and peer discovery signal configuration information (S560). The UE in the RRC_idle state may transmit a peer discovery signal to neighboring UEs based on the D2D connection response signal (S570).

FIG. 6 illustrates a D2D network entry procedure of a UE when the UE needs to enter a cellular network for D2D network entry.

Referring to FIG. 6, the UE in the RRC_idle state may transmit a RACH preamble to the base station (S610). The base station may transmit a RACH response message to the UE as a response upon reception of the RACH preamble (S620). Then, the UE in the RRC_idle state transmits a D2D and RRC connection request signal to the base station for cellular network entry and D2D network entry (S630) and the base station transmits a D2D and RRC connection response signal to the UE as a response to the D2D and RRC connection request signal (S640). The D2D and RRC connection response signal may include C-RNTI and D2D-RNTI allocation information and peer discovery signal configuration information. The UE in the RRC_idle state may transmit a peer discovery signal to neighboring UEs based on the D2D and RRC connection response signal (S650).

As described above, when cellular network entry needs to precede D2D network entry in order to perform the D2D network entry procedure, the UE carries out the cellular network entry procedure first and then switches to the RRC_connected state to perform the D2D network entry procedure in the RRC_connected state, as illustrated in FIG. 5, or simultaneously performs the D2D network entry procedure and the cellular network entry procedure using the newly defined D2D and RRC connection request/response signals to simultaneously receive C-RNTI information and RRC configuration information for cellular communication and D2D RNTI information and peer discovery signal configuration information for D2D communication, as shown in FIG. 6.

A description will be given of a method for transmitting a peer discovery reference signal or a peer discovery signal by a UE.

A UE switched to the D2D active state through the D2D network entry procedure may be allocated a dedicated channel (e.g. dedicated peer discovery channel (PDCH)) for transmitting the peer discovery signal from the base station. Every D2D terminal can be allocated one logical PDCH through a PDCH assigned through the D2D network entry procedure and transmit a peer discovery reference signal through a resource corresponding to the allocated logical PDCH in a peer discovery opportunity repeated in one peer discovery interval.

Figure 7:
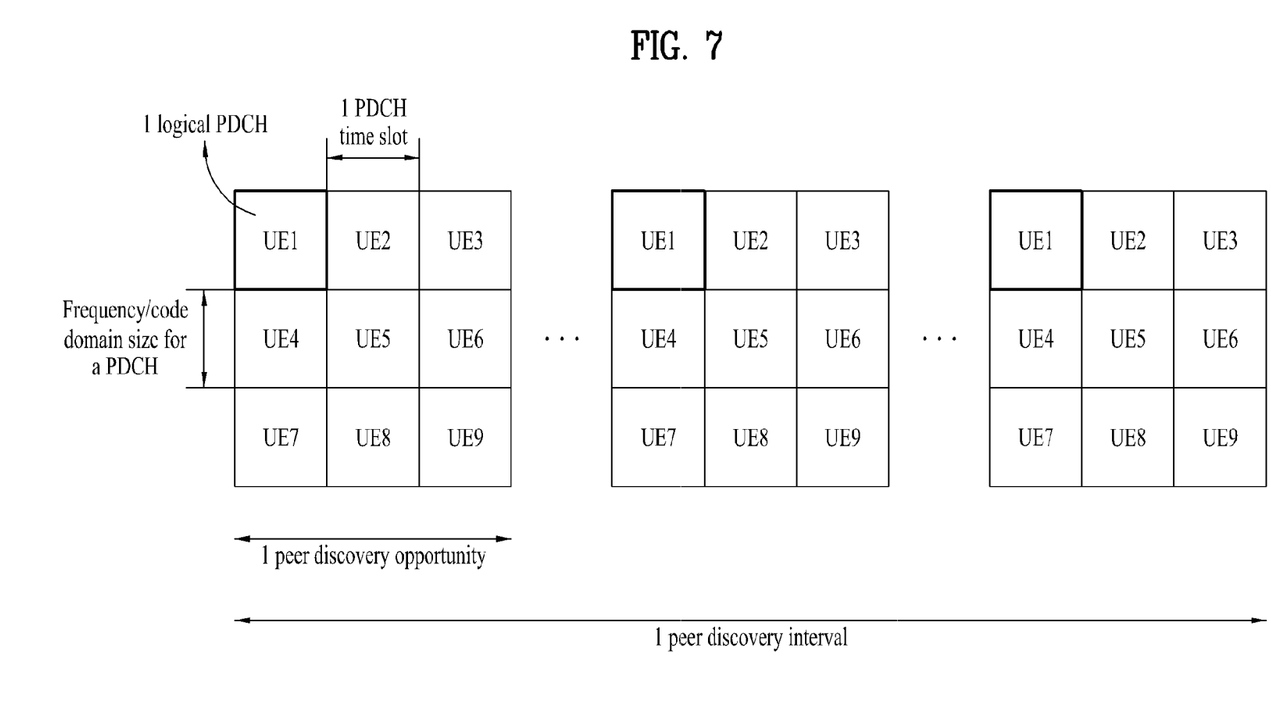
FIG. 7 illustrates one peer discovery interval according to an embodiment of the present invention.

FIG. 7 illustrates one peer discovery interval according to an embodiment of the present invention.

Referring to FIG. 7, one peer discovery interval includes one or more peer discovery opportunities each of which is configured by multiplexing physical PDCHs capable of transmitting all logical PDCHs respectively allocated to UEs in a time-frequency/code domain. For example, one peer discovery opportunity consists of three orthogonal frequency (and/or code) resources and three PDCH time slots in FIG. 7. FIG. 7 illustrates an example in which one peer discovery interval includes three peer discovery opportunities. In this case, a total of nine UEs can transmit the peer discovery signal through one peer discovery interval. Each UE can receive the peer discovery signals of neighboring UEs in periods other than the PDCH time slot for transmitting the peer discovery signal thereof and acquire information about channel measurement or synchronization with the neighboring UEs using the peer discovery signals received from the neighboring UEs.

Each UE can select a UE suitable for D2D direct communication on the basis of the channel measurement or synchronization information and transmit a D2D paging message for requesting direct communication with the selected UE to the base station. The D2D paging message may include ID of the selected UE, channel measurement information with respect to the selected UE and TA (timing alignment) information with respect to the selected UE. For identification of the UE, logical ID of a PDCH through which the selected UE transmits the peer discovery signal may be used.

The size of one peer discovery opportunity may be set by the base station. Information for setting one peer discovery opportunity may be semi-statically configured by the base station through cell-specific or UE-specific higher layer signaling or may be fixed according to PDCH structure. Alternatively, the base station may cell-specifically or UE-specifically set only the size of the frequency/code domain through higher layer signaling such that the number of PDCH time slots can be implicitly set or determined. In addition, the number of peer discovery opportunities corresponding to one peer discovery interval may be semi-statically configured by the base station through cell-specific or UE-specific higher layer signaling or may implicitly set or determined based on PDCH time slots corresponding to one peer discovery opportunity.

In one embodiment, when the base station sets the PDCH opportunity size of the frequency or code domain to K through cell-specific higher layer signaling, the number of PDCH time slots can be implicitly determined as a value N, which is larger than K, according to time domain size of a subframe in the PDCH structure and the number of peer discovery opportunities corresponding to one peer discovery opportunity can be set to N equal to the number of PDCH time slots.

Figure 8:
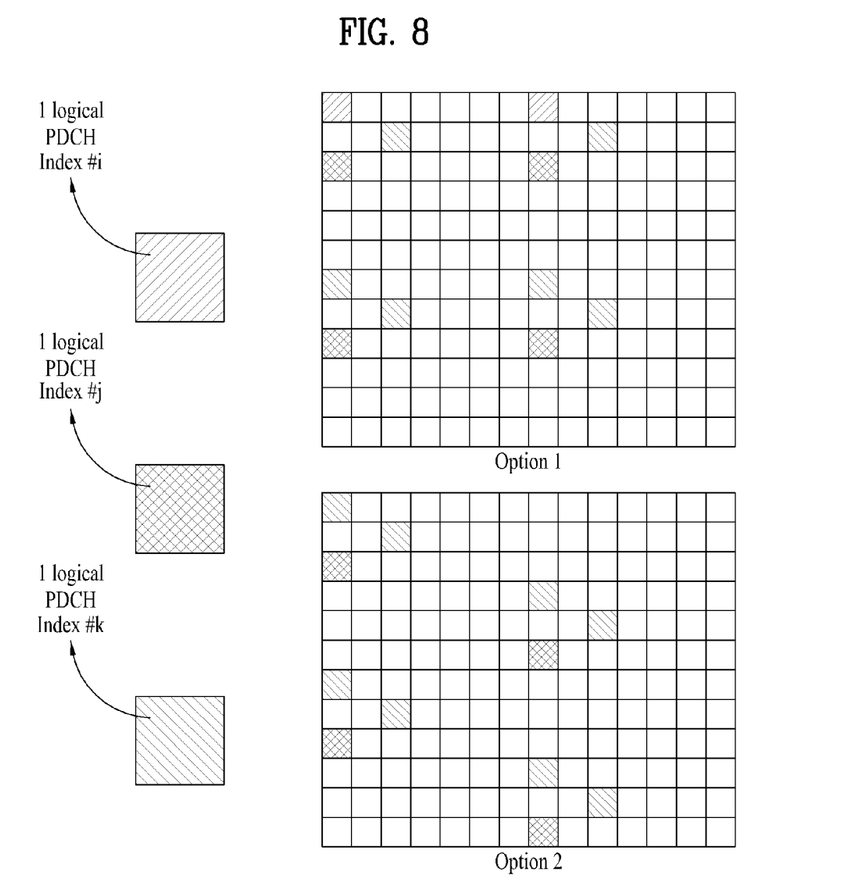
FIG. 8 illustrates mapping of logical PDCH to physical PDCH using time slot shifting.

FIG. 8 illustrates mapping of a logical PDCH to a physical PDCH using time slot shifting.

When nine UEs (UE1 to UE9) are respectively mapped to nine logical PDCHs (logical PDCH#1 to logical PDCH#9), as shown in FIG. 7, UEs (e.g. UE1, UE4 and UE7) that transmit the peer discovery signals thereof in the same PDCH time slot within a PDCH opportunity cannot receive the peer discovery signals from one another. To prevent this situation, different time slot shifts are applied to peer discovery opportunities according to physical frequency resource positions mapped to the same logical PDCH index.

For example, no time slot shifting is applied to the logical PDCH of the first row, one time slot is shifted for the logical PDCH of the second row and two time slots are shifted for the logical PDCH of the third row, as shown in FIG. 7. In this manner, it is possible to solve the problem that UEs transmitting peer discovery signals thereof in the same PDCH time slot in one PDCH opportunity cannot receive peer discovery signals from one another.

A description will be given of an odd number time slot configuration. The number of PDCH time slots corresponding to one PDCH opportunity must be an odd number and the number of peer discovery opportunities corresponding to one peer discovery interval may be implicitly fixed to the number of PDCH time slots corresponding to one PDCH opportunity.

Figure 9:
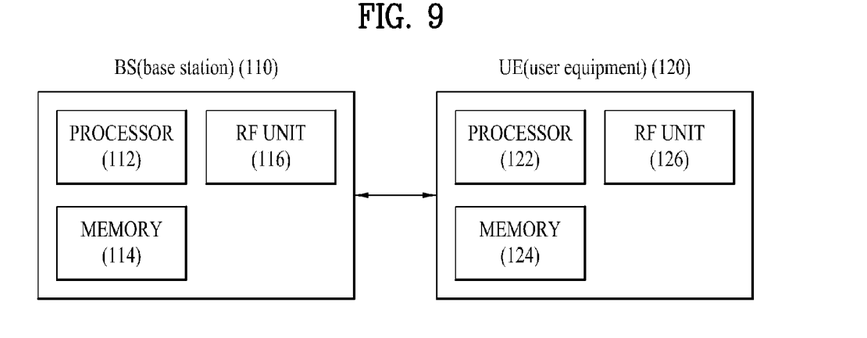
FIG. 9 illustrates a base station and a UE applicable to an embodiment of the present invention.

FIG. 9 illustrates a base station and a UE applicable to an embodiment of the present invention.

Referring to FIG. 9, a wireless communication system includes a BS 110 and a UE 120. The BS includes a processor 112, a memory 114 and a radio frequency (RF) unit 116. The processor 112 may be configured to implement procedures and/or methods proposed by the present invention. The memory 114 is connected to the processor 112 and stores information about operations of the processor 112. The RF unit 116 is connected to the processor 112 and transmit/receives RF signals. The UE 120 includes a processor 122, a memory 124 and an RF unit 126. The processor 122 may be configured to implement procedures and/or methods proposed by the present invention. The memory 124 is connected to the processor 122 and stores information about operations of the processor 122. The RF unit 126 is connected to the processor 122 and transmit/receives RF signals. The BS 110 and the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method for a UE to perform D2D direct communication in a wireless communication system, the method for supporting the same and the device for the same are applicable to various communication systems such as 3GPP LTE, LTE-A, IEEE 802, etc.

The invention claimed is:

1. A method for performing D2D (device-to-device) direct communication by a user equipment (UE) in a wireless communication system, the method comprising:
    transmitting to the base station, a first message including a D2D connection request for D2D direct communication, the UE is connected with a base station;
    receiving, from the base station, a second message corresponding to a response to the D2D connection request; and
    transmitting a peer discovery signal periodically to at least one neighboring UE according to peer discovery configuration information,
    wherein the second message includes a D2D-RNTI (radio network temporary identifier) allocated to the UE for D2D direct communication and the peer discovery configuration information,
    wherein the peer discovery configuration information indicates a time slot shift for the UE and a peer discovery channel for the peer discovery signal among a plurality of peer discovery channels, and
    wherein different time slot shifts are applied to peer discovery channels which are mapped on different frequency resources.

2. The method according to claim 1, wherein the peer discovery configuration information further includes at least one of a peer discovery logical channel ID, seed sequence information, cyclic shift information and peer discovery signal transmission period information.

3. The method according to claim 2, further comprising transmitting a scheduling request or bandwidth request signal to the base station and receiving uplink resource allocation information from the base station as a response to the scheduling request or bandwidth request signal,
    wherein the first message is transmitted on the basis of the uplink resource allocation information.

4. A method for performing D2D direct communication by a user equipment (UE) in a wireless communication system, the method comprising:
    transmitting, to a base station, a first message including a D2D connection request and a cellular connection request, the UE operates in an idle state;
    receiving, from the base station, a second message corresponding to a response to the D2D connection request and cellular connection request; and
    transmitting a peer discovery signal periodically to at least one neighboring UE according to peer discovery configuration information,
    wherein the second message includes a C-RNTI (cell-radio network temporary identifier) allocated to the UE for connection with the base station, a D2D-RNTI allocated to the UE for D2D direct communication and the peer discovery configuration information,
    wherein the peer discovery configuration information indicates a time slot shift for the UE and a peer discovery channel for the peer discovery signal among a plurality of peer discovery channels, and
    wherein different time slot shifts are applied to peer discovery channels which are mapped on different frequency resources.

5. The method according to claim 4, wherein the peer discovery configuration information further includes at least one of a peer discovery logical channel ID, seed sequence information, cyclic shift information and peer discovery signal transmission period information.

6. A method for supporting D2D direct communication by a base station in a wireless communication system, the method comprising:
    receiving a first message including a D2D connection request and a cellular connection request from a user equipment (UE) operating in an idle state; and
    transmitting, to the UE, a second message corresponding to a response to the D2D connection request and cellular connection request,
    wherein the second message includes a C-RNTI allocated to the UE for connection with the base station, a D2D-RNTI allocated to the UE for D2D direct communication and peer discovery configuration information for the UE to transmit a peer discovery signal periodically,
    wherein the peer discovery configuration information indicates a time slot shift for the UE and a peer discovery channel for the peer discovery signal among a plurality of peer discovery channels, and
    wherein different time slot shifts are applied to peer discovery channels which are mapped on different frequency resources.

7. The method according to claim 6, wherein the peer discovery configuration information further includes at least one of a peer discovery logical channel ID, seed sequence information, cyclic shift information and peer discovery signal transmission period information.

8. A user equipment (UE) for performing D2D direct communication in a wireless communication system, the UE comprising:
    a transmitter for transmitting, to a base station, a first message including a D2D connection request for D2D direct communication from the UE, the UE is connected to the base station; and
    a receiver for receiving, from the base station, a second message corresponding to a response to the D2D connection request,
    wherein the transmitter is configured to transmit a peer discovery signal periodically to at least one neighboring UE according to peer discovery configuration information,
    wherein the second message includes a D2D-RNTI allocated to the UE for D2D direct communication and the peer discovery configuration information,
    wherein the peer discovery configuration information indicates a time slot shift for the UE and a peer discovery channel for the peer discovery signal among a plurality of peer discovery channels, and
    wherein different time slot shifts are applied to peer discovery channels which are mapped on different frequency resources.

9. A user equipment (UE) for performing D2D direct communication in a wireless communication system, comprising:
    a transmitter for transmitting, to a base station, a first message including a D2D connection request and a cellular connection request from the UE, the UE operates in an idle state; and
    a receiver for receiving, from the base station, a second message corresponding to a response to the D2D connection request and cellular connection request, wherein the transmitter is configured to transmit a peer discovery signal periodically to at least one neighboring UE according to peer discovery configuration information, wherein the second message includes a C-RNTI allocated to the UE for connection with the base station, a D2D-RNTI allocated to the UE for D2D direct communication and the peer discovery configuration information, wherein the peer discovery configuration information indicates a time slot shift for the UE and a peer discovery channel for the peer discovery signal among a plurality of peer discovery channels, and wherein different time slot shifts are applied to peer discovery channels which are mapped on different frequency resources.

10. A base station for supporting D2D direct communication in a wireless communication system, the base station comprising:

a receiver for receiving a first message including a D2D connection request and a cellular connection request from a user equipment (UE), the UE operates in an idle state; and a transmitter for transmitting, to the UE, a second message corresponding to a response to the D2D connection request and cellular connection request, wherein the second message includes a C-RNTI allocated to the UE for connection with the base station, a D2D-RNTI allocated to the UE for D2D direct communication and peer discovery configuration information for the UE to transmit a peer discovery signal periodically, wherein the peer discovery configuration information indicates a time slot shift for the UE and a peer discovery channel for the peer discovery signal among a plurality of peer discovery channels, and wherein different time slot shifts are applied to peer discovery channels which are mapped on different frequency resources.

* * * * *